United States Patent

Bogoroditsky et al.

[15] 3,665,456

[45] May 23, 1972

[54] METHOD OF AND APPARATUS FOR ANALOG-TO-DIGITAL CONVERSION OF PHYSICAL VALUES AND THEIR RATIOS

[72] Inventors: Alexandr Alexandrovich Bogoroditsky, ulitsa Kranaya, I22, kv. 2.; Tamara Nikolaevna Ryzhevskaya, ulitsa Mira, 18, kv. 51; Alexei Gordeevich Ryzhevsky, ulitsa Mira, 18, kv. 51; Viktor Mikhailovich Shlyandin, ulitsa Lermontova, 12, kv. 17, all of Penza, U.S.S.R.

[22] Filed: June 8, 1970

[21] Appl. No.: 44,256

[30] Foreign Application Priority Data

July 14, 1969 U.S.S.R. ................................1348411

[52] U.S. Cl. ..........................................................340/374 AD
[51] Int. Cl. ..........................................................H03k 13/06
[58] Field of Search ..........................................340/347 AD

[56] References Cited

UNITED STATES PATENTS 3,134,971 5/1964 Sem-Sandberg ................340/347 AD
3,460,131 8/1969 Gorbatenko ....................340/347 AD

*Primary Examiner*—Maynard R. Wilbur
*Assistant Examiner*—Robert F. Gnuse
*Attorney*—Holman & Stern

[57] ABSTRACT

A method of analog-to-digital conversion of physical values and ratios thereof, consisting in that the value to be digitized is compared against a reference scale of standards based on the value of a divisor, and then several complementary scales are successively compared against the reference scale, each of the complementary scales being shifted relative to the reference scale by a value equal to the remainder left over as a result of the preceding comparison, the number of comparison operations being selected in accordance with the required accuracy of conversion, while the standards of the reference scale are presented in the course of each comparison as a sum of a coincidence zone equalling the required error of the sampling constant during the given comparison and a non-coincidence zone equal in magnitude to a respective complementary scale; and devices based on said method for analog-to-digital conversion of frequency-time signals (time intervals, duration of electric pulses, frequency of oscillations, phase shift angle between two oscillations, etc.).

7 Claims, 9 Drawing Figures

METHOD OF AND APPARATUS FOR ANALOG-TO-DIGITAL CONVERSION OF PHYSICAL VALUES AND THEIR RATIOS

The invention relates to computer and digital instrumentation engineering and, in particular, to methods of analog-to-digital conversion of physical values and their ratios, as well as to devices to perform respective operations.

The invention can be used in the computer engineering field to obtain a digital equivalent of an analog value for its subsequent processing, in telemechanics to represent an analog signal as a digital code and in instrumentation systems to obtain digital information for an analog value to be measured, with its subsequent display on a digital display panel or transfer to a recorder.

The invention can be used to digitize various physical values and their ratios, e.g., time intervals, electric pulse durations, oscillator wave frequencies, phase shift angles of two waves under study, electric voltages, linear geometric dimensions, ratios of time intervals and pulses, as well as to digitize the percent magnitude of the difference between any of the above physical values and its magnitude assumed to be the rated or optimum one.

Known in the art are different methods of analog-to-digital conversion of physical values based on comparing the magnitude to be converted against a scale of value standards or measures whose physical nature is the same as that of the magnitude to be converted and which are equal in magnitude to the required sampling constant.

The comparison process in respective devices will go on until the finally resulting remainder is less than the magnitude of the standard measure.

Also known are methods of analog-to-digital conversion of the ratio between two physical values of a similar nature based on comparing the value to be divided against a scale of value standards or measures equal to the divisor. The process of comparison will go on until the resulting remainder is less than the value of the divisor.

A disadvantage of the above methods of analog-to-digital conversion of physical values and their ratios consists in that they require many similar standards (measures) of small magnitudes and have low accuracies in cases when the dividend and the divisor are close to each other in magnitude.

Therefore, devices adapted to realize these methods, such as analog-to-digital converters of electric voltages, have low speeds, since it is required to shape a great number of value standards. Similar devices for analog-to-digital conversion of time intervals, in case they should have a high conversion accuracy, are quite complex, since it is required to obtain small value standards.

Also known are methods of analog-to digital conversion of physical values based on successively comparing the value to be converted against a series of scales while the value standards used in the course of every comparison procedure are equal in magnitude to the sampling constant obtained as a result of the given comparison procedure. A disadvantage of these methods consists in that they require value standards which differ considerably from one another during various conversion stages. Besides, these methods also envisage the provision of value standards whose magnitudes are equal to the given sampling constant.

Hence, devices based on the above methods of analog-to-digital conversion of physical values, when a high accuracy is required, should be provided with value standards whose magnitudes lie within a wide range beginning with standards equal to the given sampling constant. Analog-to-digital converters of time intervals, for instance, have limited accuracies, since it is rather difficult to obtain small value standards.

There is also known a method of analog-to-digital conversion of physical values based on that the magnitude to be digitized is compared against a reference scale of value standards derived from the reference magnitude, and then, against the same scale is compared a complementary scale, shifted with respect to the reference one by a magnitude equal to the remainder which is left over as a result of comparing the magnitude to be digitized against the reference scale, the standards of the complementary scale being selected so that their magnitudes are close to those of the reference scale (see, for instance, G. Ya. Mirsky "Time Interval Measurements," USSR, Moscow — Leningrad, "Energeia" Publishers, 1964).

A disadvantage of this analog-to-digital conversion method consists in that it requires many individual value standard to form scales, if a high conversion accuracy is necessary.

Also known are time interval analog-to-digital converters employing this method which comprise oscillators that generate reference and complementary pulse trains. The oscillators are connected, via respective keys controlled by a pulse coincidence circuit, to counters of the number of pulses in the reference and complementary trains. The reference pulse train oscillator is triggered at the starting moment of the time interval to be digitized. The complementary pulse train oscillator is triggered at the moment when the time interval to be digitized is over. Pulses produced by these oscillators are applied, via the keys, to the inputs of respective pulse counters and, via a parallel channel, to the inputs of the coincidence circuit. When one of the pulses of the complementary train coincides in time with any of the reference train pulses, the coincidence circuit will close the keys. In this case the code in the counters appears to be proportional to the digital equivalent of the analog magnitude to be digitized.

The disadvantage of such converters consists in that they require many value standards, which fact, in case it is, necessary to provide highly accurate analog-to-digital conversion of time intervals, results, for instance, in a low speed of the known devices.

The object of the present invention is to circumvent the above disadvantages.

The specific object of the invention is to provide a method of analog-to-digital conversion of physical values and their ratios and devices to perform the respective function which, in the course of the analog-to-digital conversion, make it possible to use value standards close in magnitude to one another, to increase the accuracy of digitizing ratios between magnitudes differing but slightly from one another and at the same time to either speed up or simplify the conversion procedure.

Said specific object is accomplished by a method of analog-to-digital conversion of physical values in which the magnitude to be digitized is compared against a reference scale of value standards formed by the reference magnitude and then against the same scale is compared against a complementary scale shifted with respect to the reference one by a magnitude equal to the remainder which is left over as a result of comparing the magnitude to be digitized to the reference scale. It is envisaged that a series of other complementary scales are compared in succession against the reference scale, every successive complementary scale being shifted with respect to the reference scale of value standards by a magnitude equal to the remainder that has been left over as a result of the preceding comparison, while the number of comparison procedures is selected in accordance with the required conversion accuracy and value standards of the reference scale during every comparison are presented as the sum of two zones one of which is equal to the magnitude of the sampling constant to be obtained in the course of this comparison and the second, to the value standard of the respective complementary scale. The invention also contemplates, the method of analog-to-digital conversion of a ratio between physical values when the magnitude to be sampled is compared against a reference scale of value standards derived from the magnitude of the divisor and then against the same scale is compared a complementary scale shifted with respect to the reference one by a magnitude equal to the remainder which is left over as a result of the comparison of the magnitude to be sampled to the reference scale, that a series of other complementary scales are compared in succession to the reference scale, every successive complementary scale being shifted with respect to the reference scale of value standards by a magnitude equal to the remainder that has been left over as a result of the preceding comparison, while the number of comparison procedures is selected in accordance with the required conversion accuracy and the value standards of the reference scale during every comparison are presented as the sum of two zones one of which is equal to the magnitude of the sampling constant to be obtained in the course of this comparison and the second, to the value standard of the respective complementary scale.

It is advisable that, during every successive comparison, the function of the reference scale of value standards should be performed by the scale that has served as the complementary one in the course of the previous comparison.

Said object, according to the invention, is achieved also by providing a device for analog-to-digital conversion of time intervals comprising: a reference pulse oscillator whose input is connected to the output of a shaper of time intervals to be digitized which is connected to the control input of the master key while the output of the reference pulse oscillator is connected, via the same key, to a counter of reference pulses; and a unit for master scale interpolation having a complementary pulse oscillator connected to one of the inputs of the coincidence circuit whose other input is connected, via a pulse duration shaper, to the output of the reference pulse output while the output of the coincidence circuit is connected to the first control input of the complementary key, the second control input of this key being connected to the input of the complementary oscillator and to the output of the shaper of time intervals to be digitized, the signal input being connected to the input of the pulse duration shaper, and the output, to the input of a complementary counter, with a series of units for interpolation of complementary scales which are similar to the above-mentioned unit for interpolation of the master scale, the input of the complementary oscillator of every successive unit being connected to the output of the coincidence circuit of every preceding unit, the inputs of pulse duration shapers of all units being connected to the output of the reference pulse oscillator, the output of the complementary counter of every successive unit being connected to the input of the complementary counter of every preceding unit; and by providing a device for analog-to-digital frequency conversion comprising: a reference time interval oscillator whose input is connected to the output of the pulse shaper of the frequency to be digitized which is connected to the input of a frequency period selector and, via the master key, to the pulse counter, while the output of the reference time interval oscillator is connected to the control input of the master switch, — with, at least one unit of master scale interpolation which comprises an oscillator of a train of pulses forming a complementary scale, the first input of the oscillator being connected to the output of the selector of the period of the frequency to be digitized, the second input being connected to the output of the reference time interval oscillator and the output, to one of the inputs of the coincidence circuit whose second input is connected, via a pulse duration shaper, to the output of the shaper of the pulses of the frequency to be digitized and whose output is connected to the first control input of the complementary key, the second control input of which is connected to the output of the reference time interval oscillator, the signal input, to the output of the shaper of pulses of the frequency to be digitized, and the output, to the input of the complementary counter.

In a device for analog-to-digital frequency conversion it is expedient to select the number of scale interpolation units according to the required accuracy and speed of conversion, while the input of the pulse duration shaper and the signal input of the complementary key of every unit should be connected to the output of the shaper of pulses of frequency to be digitized, the first input of the pulse train oscillator of every unit should be connected to the selector of the period of the frequency to be digitized, the second input of the pulse train oscillator of every successive unit should be connected to the second control input of the complementary key of the same unit and to the output of the coincidence circuit of the preceding unit, and the counters of all the units should be connected to one another in series.

In a device for analog-to-digital conversion of time interval ratios it is reasonable that the control input of the master key should be connected to the output of a memory of the time interval to be sampled, one input of which is connected to the output of the selector of the time interval to be sampled, and the second input, to the output of the shaper of pulses of the frequency to be digitized, the input of this shaper being fed with pulses whose repetition period is equal to the time interval of the divisor.

It is feasible that a device for time interval analog-to-digital conversion, comprising: a reference pulse oscillator whose input is connected to the output of the shaper of the time interval to be digitized coupled to the control input of the master key, and whose output is connected, via the same key, to the reference pulse counter, and a unit for master scale interpolation having a complementary oscillator connected, via the complementary key, to the input of the complementary counter and, immediately, to one of the inputs of the coincidence circuit the second input of which is coupled, via the pulse duration shaper, to the output of the reference pulse oscillator and the output of which is connected to the first control input of the complementary key, should be provided with a series of units for complementary scale interpolation designed in the way similar to that of the above-mentioned unit for master scale interpolation, while the input of the complementary oscillator of every successive unit should be connected to the second control input of the complementary key and to the outputs of the gate of the same unit, one input of which is connected, via a gate pulse oscillator, to the output of the coincidence circuit of the preceding unit, and the other input of which is also connected to the input of the pulse duration shaper of the preceding unit and while the output of the complementary oscillator of every preceding unit should be connected to the input of the pulse duration shaper of the successive unit, and the complementary counters of all units should be connected to one another in series.

The invention will be better understood from the following description of its embodiments given by way of example only and from the accompanying drawings, in which.

The succession of operations envisaged in the method of analog-to-digital conversion of physical values by means of comparing all complementary scales to one reference scale is as follows.

Figures 1, 2:
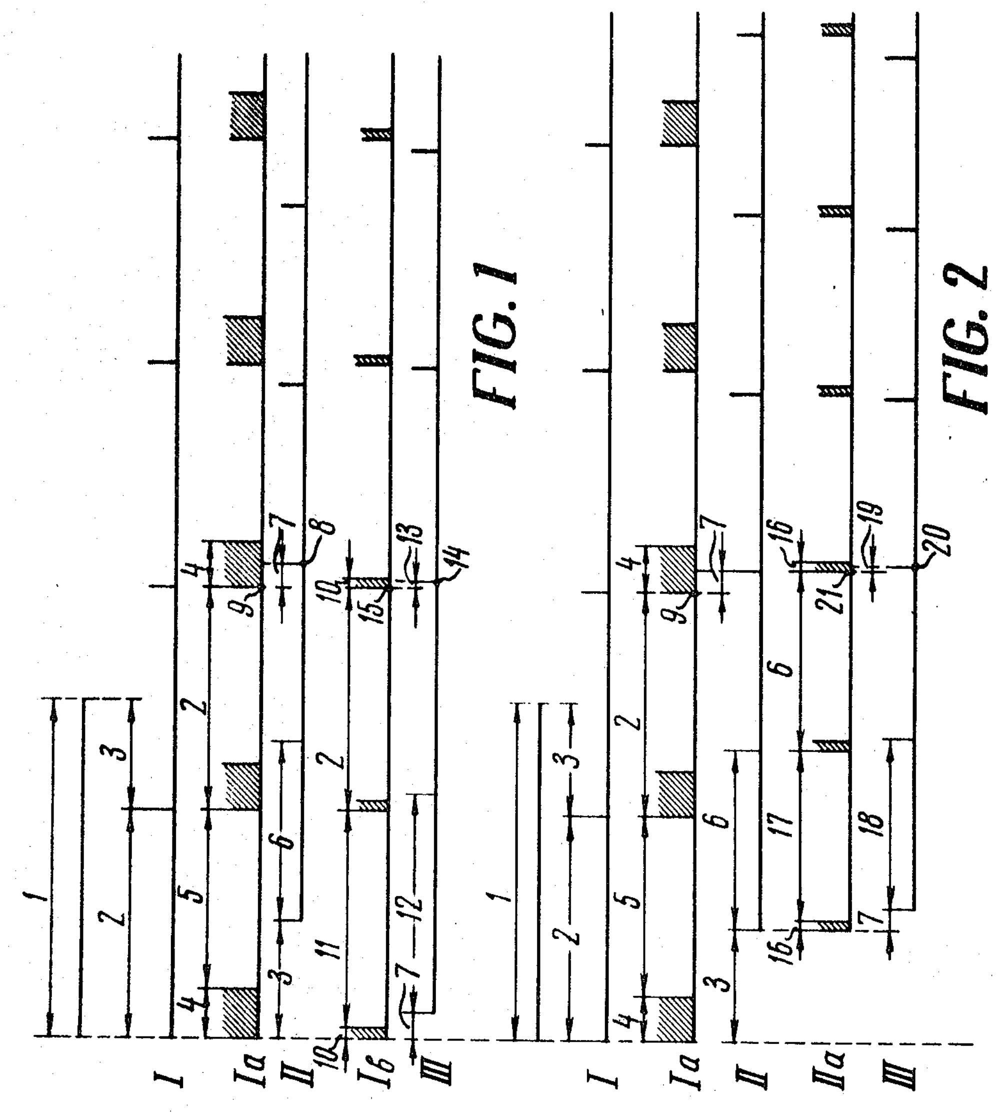
FIG. 1 shows schematically the succession of operations when the method of analog-to-digital conversion of physical values and their ratios is based on comparing all complementary scales against a single reference one.
FIG. 2 shows schematically the succession of operations when the method of analog-to-digital conversion of physical values and their ratios is based on comparing complementary scales against one another.

A magnitude 1 to be digitized (FIG. 1), e.g., a time interval, an electric voltage, a section of a straight line, etc., is compared against a reference scale I of value standards 2, derived from a reference value of the physical nature identical to that of the magnitude 1 to be digitized, to obtain a remainder 3 which is a result of the first comparison. In this case the result of the comparison is determined according to the whole number of the value standards 2 of the scale I contained within the range of the magnitude 1 to be digitized, while the remainder 3 is equal in magnitude to the difference between the magnitude 1 to be digitized and the whole number of the value standards 2 which is the nearest to it and is, for instance, less than it. Then, the standards 2 of the same reference scale I are presented as the sum of the first zone 4, such as the duration of a pulse, the width of the triggering zone of an amplitude analyzer, etc., and the second zone 5, such as an interval between pulses, the difference between operation thresholds of two amplitude analyzers, etc.

Thus, a scale I*a* is obtained.

Then, against the new scale I*a* is compared the first complementary scale II of value standards 6 shifted with respect to the reference scale I*a* by the magnitude of the remainder 3 left over as a result of the first comparison to separate in this way the remainder 7 of the second comparison.

In this case the result of the second comparison is determined, four instance, according to the whole number of the value standards 2 of the reference scale I*a* contained between the beginning of the reference scale I*a* and one of the zones 4 coinciding with any mark in the complementary scale II. The remainder 7 of the second comparison is equal in magnitude to a section of the zone 4 coinciding with a mark 8 of the complementary scale II, the section being contained between the front boundary 9 of this zone 4 and the mark 8. The magnitude of the zone 4 is selected to be equal to the sampling constant of the second comparison, and the value of the standard 6 is made equal to the value of the zone 5 of the value standards 2 in the reference scale I*a*.

Then, the value standards 2 of the same reference scale are presented as the sum of a zone 10 and a zone 11.

Thus, a scale I*b* is obtained.

After that against the scale I*b* is compared the second complementary scale III of value standards 12 shifted with respect to the reference scale by the magnitude of the remainder 7 left over as a result of the second comparison to separate in this way the remainder 13 of the third comparison. The result of the third comparison is determined for instance, according to the whole number of the value standards 2 of the reference scale I*b* contained between the beginning of the reference scale I*b* and one of the zones 10 which has coincided with any mark 13 of the complementary scale III. The remainder 13 of the third comparison is equal in magnitude to a section of the zone 10 which has coincided with a mark 14 of the complementary scale III, said section being contained between the front boundary 15 of this zone 10 and the mark 14. The magnitude of the zone 10 in this case is selected to be equal to the sampling constant of the third comparison, and the value of the standard 12 of the complementary scale III is made equal to the magnitude of the zone II of the value standard 2 in the reference scale I*b*. Other scales are then obtained in a similar way, and the comparison procedure is repeated.

It is advisable, that the number of such comparisons should be selected according to the required conversion accuracy, while the respective procedures should be iterated until a required accuracy is attained.

In the course of every comparison procedure it is possible to estimate one order of the digit, e.g., that sufficient for the digital equivalent of the magnitude being digitized. In this case it is expedient that the magnitude of the value standard of the reference scale should be selected equal to the sampling constant of the top digit to be estimated (1000 conditional units, for instance), while the magnitude of the coincidence zone 4 of the master scale standard during every comparison procedure should be selected equal the sampling constant of the order of the digit which is estimated during the given comparison procedure (for instance, 100;10;1 conditional units). During every comparison procedure it is possible to estimate a number of orders of the digit consecutively. In this case the magnitude of the comparison zone of the master scale standard for every comparison procedure should be selected to be equal to the sampling constant of the low-order digit to be estimated during the given comparison procedure.

During every comparison procedure it is possible to estimate a number of orders of the digit, for instance, decimal ones, simultaneously.

In this case it is reasonable that the magnitude of the reference scale value standard should be selected equal to the sum of sampling constants of all the orders of the digits to be estimated, e.g., to 1111 conditional units, while the magnitude of the coincidence zone of the reference scale value standard during every comparison operation should be selected equal to the sum of sampling constants of all the orders of the digit to be estimated in the course of the given comparison procedure, e.g. to 111; 11; 1 conditional units. Here the result of every comparison should be simultaneously stored in recorders of respective orders of the digit.

Said method can be used for analog-to-digital measurements of ratios between two physical values. In this case it is not the magnitude 1 to be digitized that is first compared to the reference scale I, but the magnitude of the dividend, such as the level of an electric voltage, a time interval, the period of a pulse repetition frequency, etc., while the value standards of the reference scale I are shaped to be equal to the value of the divisor, such as, again, the level of an electric voltage, a time interval, the period of a pulse repetition frequency, etc. The succession of operations in this case is the same as described above.

Let the magnitude 1 be a time interval which is proportional to the phase shift between two oscillations under study, and the value standards 2 of the reference scale I be selected equal in magnitude to the period of the two oscillations. Then the result of the analog-to-digital conversion performed in accordance with the method described above will be proportional to the digit equivalent of the ratio between the frequencies of these two oscillatory processes.

Let the magnitude 1 be a reference time interval, and the value standards 2 of the reference scale I be expressed in terms of a period of an oscillatory process. In this case the result of the analog-to-digital conversion performed in accordance with the method described above will be proportional to the digit equivalent of the frequency of this oscillatory process.

The succession of operations to be carried out for analog-to-digital conversion of physical values, in accordance with the method which envisages that in the course of every successive comparison the function of the reference scale is performed by the complementary scale of the preceding comparison, is as follows.

First, a series of operations described above are carried out, viz.: the magnitude 1 to be digitized (FIG. 2) is compared to the reference scale I of the value standards 2; the remainder 3 of the first comparison is obtained; the value standards 2 of the scale I are presented as the sum of the first zone 4 and the second zone 5; the scale I*a* is obtained; the complementary scale II shifted with respect to the scale I*a* by the magnitude of the remainder 3 left over as a result of the first comparison, is compared to the scale I*a;* and the remainder 7 left over as a result of the second comparison is obtained. Then the value standards 6 of the shifted complementary scale II are presented as the sum of a zone 16 and a zone 17. Thus, the scale II*a* is obtained. After that, against the scale II*a* is compared the second complementary scale III of value standards 18 which is shifted with respect to the first complementary scale II*a* by the magnitude of the remainder 7 left over as a result of the second comparison. Thus, a remainder 19 of the third comparison is obtained. The result of the third comparison is determined, for instance, by the whole number of value standards 6 of the first complementary scale II*a* contained between the beginning of this scale II*a* and one of the zones 16 that has coincided with any mark 20 of the complementary scale III. The remainder 19 of the third comparison is equal in magnitude to a section of the zone 16 that has coincided with any mark 20 of the complementary scale III contained between the front boundary of this zone 21 and the mark 20. The magnitude of the zone 16 in this case is selected to be equal to the sampling constant of the third comparison, while the magnitude of the value standard 18 of the complementary scale III is made equal to that of the zone 17 of the value standard 6 of the complementary scale II*a*. Then, new scales are produced in the same way, and comparison operations are repeated. It is reasonable that the number of such comparisons should be selected according to the required conversion accuracy and that the operations described above should be repeated until the required accuracy is obtained.

In the course of every comparison it is possible to estimate one or several order of the digital equivalent of the value to be digitized, following the procedure described above.

The succession of the above procedures can be used for analog-to-digital conversion of a ratio of physical values as shown above.

A device for analog-to-digital conversion of time intervals comprises a shaper 22 (FIG. 3) of the time interval $t_x$ to be digitized, which shapes the interval $t_x$ as a gap between two electric pulses corresponding to the beginning and to the end of the given interval $t_x$. The shaper 22 is coupled to a reference pulse oscillator 23 arranged as a shock-excited circuit. It controls a master key 24 through which the output of the oscillator 23 is connected to the input of a master counter 25.

Said device comprises also a master scale interpolation unit IV consisting of a complementary pulse oscillator 26 arranged also as a shock-excited circuit whose input is connected to the output of the shaper 22 and whose output, to an input 27 of a pulse coincidence circuit 28. An additional input 29 of the circuit 28 is coupled, via a pulse duration shaper 30, with the output of the reference pulse oscillator 23, while the output thereof is connected to a first control input 31 of a complementary key 32. Hence, if a signal appears at the output of the circuit 28 the key 32 will close. A second control input 33 of the complementary key 32 is connected to the output of the shaper 22 of the time interval $t_x$ to be digitized. The reference pulse oscillator 23 is coupled, via the complementary key 32, with the input of a complementary counter 34.

Said device comprises also a plurality of complementary scale interpolation units V, VI, etc., the number of which depends upon the desired accuracy and speed of analog-to-digital conversion. The complementary scale interpolation units V, VI, etc. are designed in the way similar to that of the master scale interpolation unit IV and comprise identical components. Additionally, the output of the reference pulse oscillator 23 is connected, via the complementary key 32, $32^1$, $32^2$. . . , $32^n$ (where $n$ is the number of complementary scale interpolation units) of every one of the units IV; V; VI, etc., to the input of a respective complementary counter 34; $34^1$; $34^2$, . . . , $34^n$. The output of the reference pulse oscillator 23 is connected also to the inputs of the shapers 30; $30^1$; $30^2$, . . . , $30^n$ of all the units IV, V, VI, etc. The output of the circuit 28; $28^1$; $28^2$, . . . , $28^n$ of every preceding unit IV, V, VI, etc. is connected to the input of the complementary oscillator $26^1$; $26^2$, . . . , $26^n$ and the control input $33^1$; $33^2$, . . . , $33^n$ of the complementary key $32^1$, $32^2$, . . . , $32^n$ of the successive unit V, VI, etc. The complementary counters 34; $34^1$; $34^2$; etc. of all the units IV, V, VI, etc. are connected to one another in series.

A device for analog-to-digital frequency conversion comprises a shaper 35 (FIG. 4) of pulses of the frequency $f_x$ to be digitized. The shaper 35 is coupled with a reference time interval oscillator 36. The oscillator 36 can be arranged as a circuit comprising a stable high-frequency pulse oscillator, a key and a bank of pulse frequency dividers. The reference time interval oscillator 36 controls the master key 24 which commutates the output of the shaper 35 of pulses of the frequency to be digitized with the input of the master counter 25. The device contains a selector 37 of the period of the frequency to be digitized whose input is connected to the output of the shaper 35 of pulses of the frequency to be digitized.

Said device comprises also a master scale interpolation unit VII which includes an oscillator 38 of a train of pulses forming a complementary scale. The function of the oscillator 38 is to shape and deliver, at the required moment of time, a pulse train with a period of the repetition rate which differs from that of the frequency $f_x$ to be digitized by a given magnitude. The circuit of the oscillator 38 can use both analog components, such as magnetic integrating elements, and digital devices, such as two pulse counters connected to each other through a code comparison circuit and being filled with different frequencies. A first input 39 of the oscillator 38 is connected to the output of the frequency period selector 37, a second input 40 of the oscillator 38 is connected to the output of the reference time interval oscillator 36, and the output of the oscillator 38 is connected to the input 27 of the pulse coincidence circuit 28. The master scale interpolation unit VII comprises also a pulse duration shaper 41. The function of the shaper 41 is to shape the duration of pulses of the frequency to be digitized, which is equal to a certain portion of their repetition rate period. The shaper 41 can be arranged as a circuit similar to that of the pulse train oscillator 38, but with much less stringent accuracy requirements. The first input 42 of the shaper 41 is connected to the output of the shaper 35 of pulses of the frequency to be digitized, while a second input 43 of the shaper 41 is connected to the input 39 of the pulse train oscillator 38. The output of the shaper 41 is connected to the input 29 of the pulse coincidence circuit 28. The output of the circuit 28 is connected to the first control input 31 of the complementary key 32 whose second control input 33 is connected to the output of the reference time interval oscillator 36. The output of the shaper 35 of pulses of the frequency to be digitized is connected, via the complementary key 32, to the input of the complementary counter 34. Said device for frequency analog-to-digital conversion comprises also a plurality of complementary scale interpolation units VIII, IX, etc., the number of which depends upon the required accuracy and speed of conversion. The complementary scale interpolation units VIII, IX, etc. are designed in the way similar to that of the master scale interpolation unit VII and use identical components. Here, the output of the shaper 35 of pulses of the frequency to be digitized is connected to the inputs 42, $42^1 42^2$, . . . , $42^n$ of the pulse duration shapers 41, $41^1$, $41^2$, . . . , $41^n$ of all the units VII, VIII, IX, etc., and via the complementary key 32, $32^1 32^2$, . . . , $32^n$ of every unit VII, VIII, IX, etc., it is connected to the input of the complementary counter 34, $34^1 34^2$, . . . $34^n$ of the respective unit VII, VIII, IX, etc. The output of the selector 37 of the period of the frequency to be digitized is connected to the inputs 39, $39^1 39^2$, . . . , $39^n$ of the pulse train oscillators 38, $38^1$, $38^2$, . . . , $38^n$ of all units VII, VIII, IX, etc. The output of the pulse coincidence circuit 28, $28^1$, $28^2$, . . . , $28^n$ of every preceding unit VII, VIII, IX, etc. is connected to the input $40^1$, $40^2$, . . . , $40^n$, etc. of the pulse train oscillator $38^1$, $38^2$, . . . , $38^n$ and to the control input $33^1$, $33^2$, . . . , $33^n$ of the complementary key $32^1$, $32^2$, . . . $32^n$ of the successive unit V, VI, etc. The complementary counters 34, $34^1$, $34^2$, . . . , $34^n$ of all units VII, VIII, IX, etc. are connected to one another in series.

A device for analog-to-digital conversion of time interval ratios (FIG. 5) differs from the above described device for analog-to-digital frequency conversion (FIG. 4) in that, instead of the reference time interval oscillator 36, it uses a memory 44 of the time interval of the dividend. An input 45 of the memory 44 is connected to the output of the shaper 35 of pulses of the frequency to be digitized, while input 46 of the memory 44 is connected to the output of a dividend time interval selector 47.

The memory 44 controls the operation of the master key 24, while its output is connected also to the input 40 of the oscillator 38 producing trains of pulses forming a complementary scale, and to the control input 33 of the complementary key 32 of the master scale interpolation unit VII.

In the course of analog-to-digital frequency conversion the input of the shaper 35 of pulses of the frequency to be digitized is fed with oscillations which serve as a divisor 49 and which it is required to convert to a digital equivalent. The input of the selector 47 is fed with a reference time interval which serves as a dividend 48. The memory 44 may be designed in any respective way to ensure the storage of the said time interval in the form of a digital code and the subsequent restoration of this time interval. In the course of analog-to-digital conversion of a phase-shift angle between two oscillations under study the input of the shaper 35 of pulses of the frequency to be digitized is fed with one of the signals under study that serves as a divisor 49. At the same time the input of the selector 47 is fed with a time interval which serves as the dividend 48 and which determines the phase shift between the two oscillations under study. In the course of analog-to-digital conversion of a ratio between the frequencies of two oscillations under study the input of the shaper 35 is fed with a signal having the frequency of the dividend and serving as the magnitude 49, while the input of the selector 47 is fed with a signal having the frequency of the divisor and serving as the magnitude 48. In the course of analog-to-digital conversion of the deviation percentage of the frequency of the oscillation under study from the rated value, the input of the shaper 35 is fed with the signal of the oscillations under study serving as the magnitude 49, while the input of the selector 47 is fed with a signal serving as the magnitude 48 whose frequency is equal to the required rated value. And finally, in the course of analog-to-digital conversion of a ratio between time intervals, the input of the selector 47 is fed with the time interval of the dividend which serves as the magnitude 48, while the input of the shaper 35 is fed with the time interval of the divisor which serves as the magnitude 49. In the latter case the function of the shaper 35 consists in that it stores the magnitude of the time interval of the divisor and then repeats it many times afterwards. Here, the shaper 35 may be designed in the way similar to that of the above-mentioned oscillator 38 generating pulse trains to form the complementary scale.

Another version of a device for analog-to-digital conversion of time intervals (FIG. 6) differs from the first one which has been described above (FIG. 3) in that a master scale interpolation unit X comprises a gate pulse oscillator 50 whose input is connected to the output of the pulse coincidence circuit 28 and whose output is connected to a first input 51 of a gate 52, a second input 53 of the latter being connected to the output of the reference pulse oscillator 23. Complementary scale interpolation units XI, XII, etc. are designed in the way similar to that of the master scale interpolation unit X and comprise identical components. Here, the output of the complementary pulse oscillator 26, $26^1$, $26^2$, . . . , $26^n$ of every preceding unit X, XI, XII, etc. is connected to an input $53^1$, $53^2$, . . . , $53^n$ of every successive unit XI, XII, etc., while the input of the complementary pulse oscillator $26^1$, $26^2$, . . . , $26^n$ and the control input $33^1$, $33^2$, . . . $33^n$ of the complementary key $32^1$, $32^2$, . . . , $32^n$ of every successive unit XI, XII, etc., is connected to the output of the gate 52, $52^1$, $52^2$, . . . , $52^n$ of the preceding scale interpolation unit X, XI, XII, etc.

Figure 3:
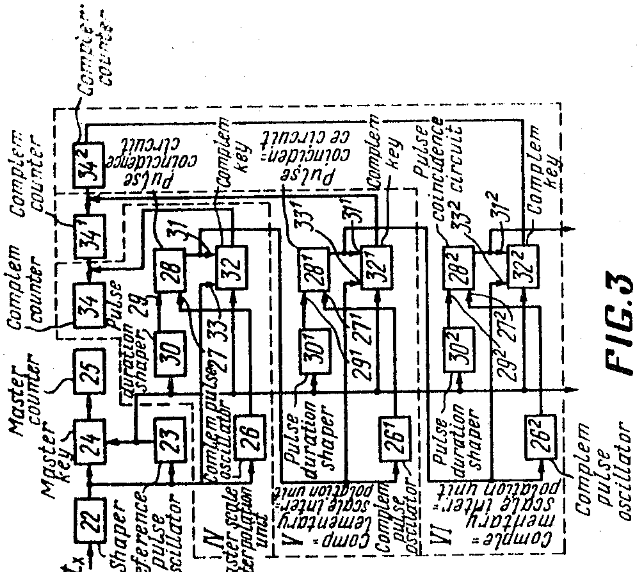
FIG. 3 is a block diagram of an analog-to-digital converter of time intervals.
Figure 7:
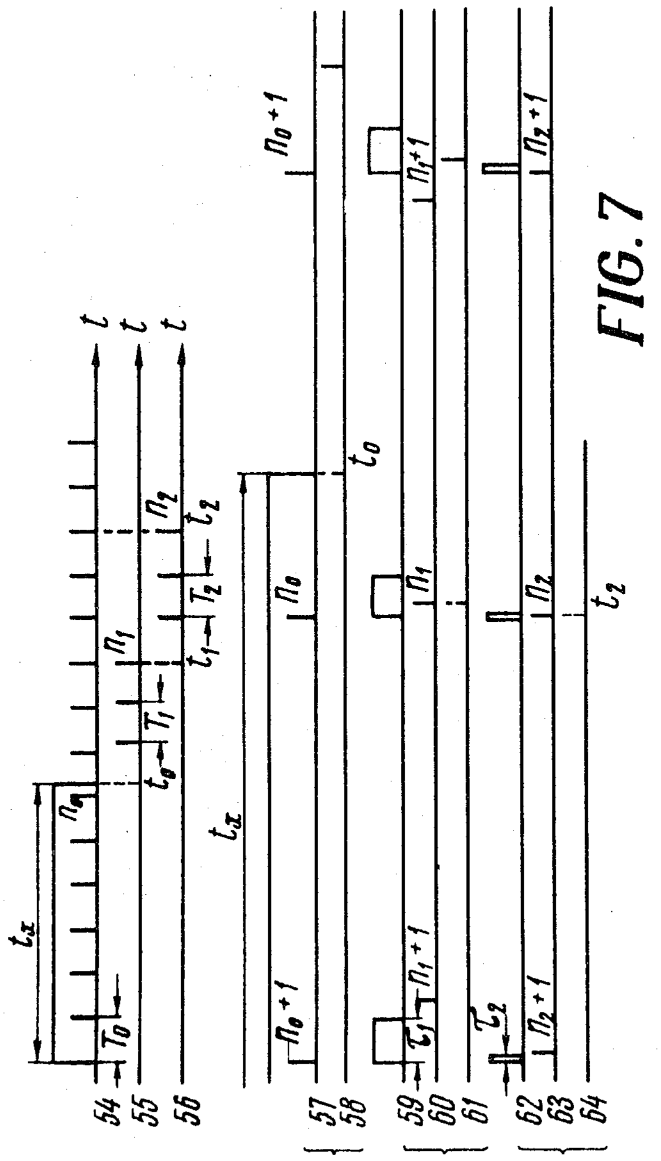
FIG. 7 shows schematically the time relationships of events which take place in the course of operation of the time interval analog-to-digital converter.

In will be convenient to consider the operation of the device for analog-to-digital conversion of time intervals whose block diagram is presented in FIG. 3 in conjunction with the time relationships pertaining to it which are shown schematically in FIG. 7. Diagram 54 in FIG. 7 pertains to the output of the reference pulse oscillator 23. Diagrams 55 and 56 show the output signals of the complementary pulse oscillators 26 and 26', respectively.

The device operates as follows:

The shaper 22 (FIG. 3) of the time interval to be digitized produces, as its output, two pulses that correspond to the beginning and to the end of the time interval $t_x$ to be digitized. The first of these pulses triggers the reference pulse oscillator 23 and opens the master key 24 to make the latter pass pulses of the oscillator 23 with a repetition period $T_o$ to the counter 25. The pulse from the output of the shaper 22 which corresponds to the end of the time interval $t_x$ to be digitized closes the master key 24 to stop the pulses from the oscillator 23 from entering the master counter 25. Thus, the master counter 25 registers, for instance, a number $n_o$ which corresponds to the top digit of the digital equivalent of the time interval to be digitized. There may be, of course, cases when the number $n_o$ is zero.

Simultaneously, the above-mentioned pulse that corresponds to the end of the time interval to be digitized triggers the complementary pulse oscillator 26 and, arriving at the control input 33 of the complementary key 32, opens the latter. In FIG. 7 the moment of this event is indicated at $t_o$. Besides, FIG. 7 shows, on an enlarged scale, output pulses of the reference pulse oscillator 23 (diagram 57) and the first pulse at the output of the complementary pulse oscillator 26 (diagram 58) during a period of time which corresponds to the end of the time interval to be digitized. The dashed line in diagram 58 marks the moment when the complementary pulse oscillator 26 is triggered. The pulse repetition period $T_1$ of the complementary oscillator 26 can be selected as, for instance, $T_1 = 0.9\ T_o$. The above-mentioned pulses from the output of the oscillator 26 are applied to the input 27 of the pulse coincidence circuit 28 and then, via the complementary key 32 which is open, to the input of the complementary counter 34.

The pulse duration shaper 30 produces pulses whose length is selected as, for instance, $\tau_1=0.1\ T_o$, and whose repetition period is $T_o$. These pulses are fed to the input 29 of the pulse coincidence circuit 28. It is obvious, that with proper selection of the values of $T_o$; $T_1$ and $\tau_1$ one of the nine pulses appearing at the input 27 of the pulse coincidence circuit 28 will coincide in time with one of the pulses at its input 29. At the moment of pulse coincidence the circuit 28 will produce a signal which will close the complementary key 32.

Thus, the complementary counter 34 will register the number of pulses, such as $n_1$, which is equal to the value of the next order of the digital equivalent of the time interval to be digitized. Simultaneously, a signal from the output of the pulse coincidence circuit 28 will excite the complementary oscillator 26 and open the complementary key 32 of the complementary scale interpolation unit V (moment of time $t_1$ in FIG. 7). Pertaining to the same moment of time are signals at the inputs 29 and 27 of the pulse coincidence circuit 28, as well as pulses at the output of the complementary oscillator 26, shown in diagrams 59, 60, 61 respectively (FIG. 7). A dashed line in diagram 61 marks the moment when the complementary pulse oscillator 26 is triggered. The period $T_2$ of the pulse repetition rate of this complementary oscillator 26 is selected to be, for instance, $T_2=0.99\ T_o$. The operation of the complementary scale interpolation unit V is similar to that of the master scale interpolation unit IV described above.

Pulses from the output of the complementary oscillator $26^1$ are applied to the input $27^1$ of the pulse coincidence circuit $28^1$. The input $29^1$ of this circuit $28^1$ is fed, via the pulse duration shaper $30^1$, with pulses from the output of the reference pulse oscillator 23.

The pulse duration $\tau_2$ is selected to be, for instance, $\tau_2 = 0.01\ T_o$. Pulse from the output of the reference pulse oscillator 23 are applied also to the complementary counter $34^1$ via the complementary key $32^1$ which at this moment. is open. It is evident, that with the given relationship between the values of $T_2$, $\tau_2$ and $T_o$ one of the nine pulses at the input $27^1$ of the pulse coincidence circuit $28^1$ will coincide in time with a certain pulse appearing at its input $29^1$. At this moment of pulse coincidence the circuit $28^1$ will generate a signal that will close the complementary key $32^1$. Thus, the complementary counter $34^1$ will register a number of pulses, such as $n_2$, equal to the value of the next order of the digital time interval to be digitized. Simultaneously, a signal from the output of the pulse coincidence circuit $28^1$ will excite the complementary oscillator $26^2$ and open the complementary key $32^2$ of the complementary scale interpolation unit VI moment of time $\tau_2$ in FIG. 7).

Pertaining to the same moment of time are signals, at the inputs $29^1$ and $27^1$ of the pulse coincidence circuit $28^1$, as well as the moment of triggering of the complementary oscillator $26^2$ shown in the diagrams 62, 63, 64, respectively (FIG. 7). The operation of the complementary scale interpolation unit VI is similar to that of the units IV and V described above. The period of the pulse repetition rate of the oscillator $26^2$ is selected to be, for instance, $T_3 = 0.999\ T_o$, while the input $29^2$ of the circuit $28^2$ is fed with pulses having, for instance, a duration of $\tau_3 = 0.001 T_o$. The complementary counter $34^2$ will register, for instance, a number $n_3$ of pulses produced by the reference oscillator 23 and delivered through the complementary key $32^2$. For the example cited above the result of the analog-to-digital conversion of the time interval $t_x$ will be expressed as $$t_x = T_o(n_o + 0.1\ n_1 + 0.01\ n_2 + 0.001\ n_3).$$

It can be seen from the diagrams in FIG. 7 that in case the pulse duration $\tau$ in one of the scale interpolation units IV, V, VI, etc. exceeds the nominal one determined on the basis of the above relationships, this unit may have an error, that is, one of the pulses at the input 29; $29^1$; $29^2$, . . . , $29^n$ of the pulse coincidence circuit 28; $28^1$, $28^2$; . . . , $28^n$ will coincide not with the $n_i$th pulse of the respective train but with the $(n_i-1)$ th pulse of the given train. The error in the pulse coincidence will result in an erroneous estimation of the respective order of the digital equivalent of the time interval to be digitized. This drawback can be easily eliminated by series-connection of the complementary counters 34; $34^1$; $34^2$; . . . , $34^n$.

In this case an error in pulse coincidence in one of the preceding units IV, V, VI, etc. will invariably produce a pulse indicating an overflow of the complementary counter $34^1$, $34^2$, . . . , $34^n$ of the respective successive unit. This pulse will be carried over to the complementary counter 34, $34^1$, $34^2$, . . . , $34^n$ of the preceding unit IV, V, VI, etc. In this way the result of the conversion will be corrected.

The example that has just been described pertains to a device using the decimal number base. However, this method can be used to design a similar device operating with any other number base.

Figure 4:
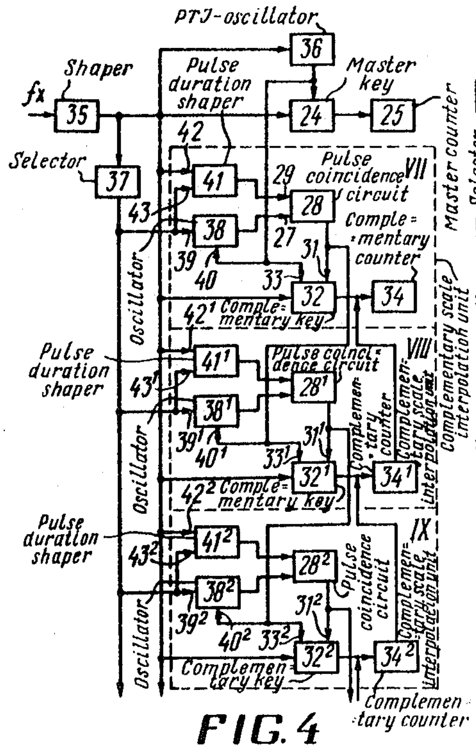
FIG. 4 is a block diagram of an analog-to-digital frequency converter.
Figures 8, 9:
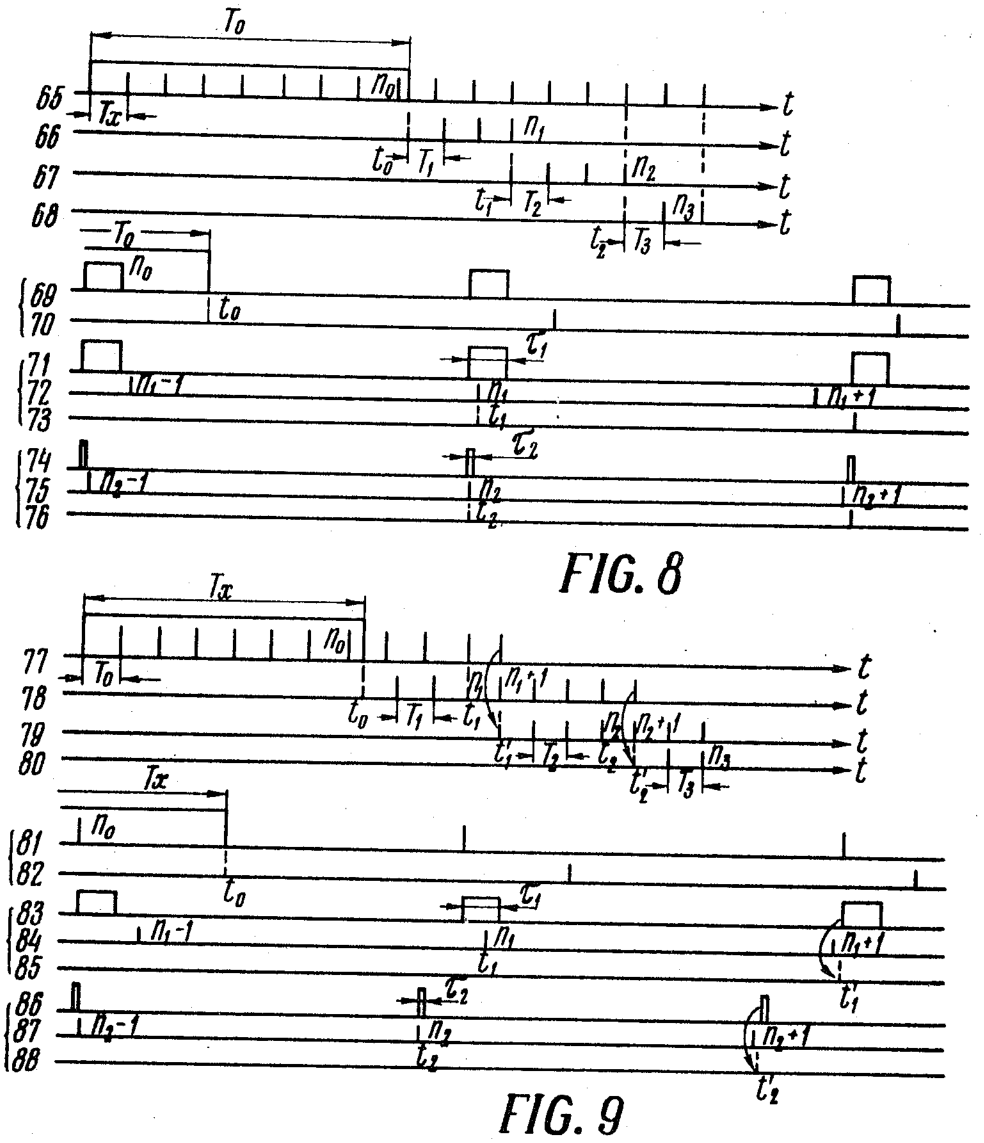
FIG. 8 shows schematically the time relationships of events taking place in the course of operation of the frequency analog-to-digital converter.
FIG. 9 shows schematically the time relationships of events taking place in the said second version of the time interval analog-to-digital converter.

The operation of the device for analog-to-digital frequency conversion, the block diagram of which is shown in FIG. 4 will be convenient to consider in conjunction with the time relationships of events taking place in it and shown schematically in FIG. 8. Diagram 65 (FIG. 8) relates to the output of the shaper 35 of pulses of the frequency $f_x$ to be digitized. Diagrams 66, 67, 68, pertain respectively to output signals of the oscillators 38, $38^1$, $38^2$ of pulse trains that form the complementary scale.

The first pulse of the frequency to be digitized that arrives from the output of the pulse shaper 35 excites the oscillator 36 of the reference time interval $T_o$. This oscillator 36 opens the master key 24 for a time $T_o$. The key 24 lets pulses of the frequency to be digitized pass to the input of the master key 25. The duration of the time interval $T_o$ can be selected to be sufficient for estimating only the top digit of the digital equivalent of the frequency to be digitized, i.e., for instance, more than 10 periods of the maximum value of the frequency to be digitized. During this time interval $T_o$ the master counter 25 will register, for instance, a certain number $n_o$ of pulses of the frequency to be digitized. The selector 37 of the period $T_x$ of the frequency to be digitized separates said period of the frequency to be digitized and produces a signal proportional to it. This signal is applied to the input 43, $43^1$, $43^2$, . . . , $43^n$ of the pulse duration shapers 41, $41^1$, $41^2$, . . . , $41^n$ and to the input 39, $39^1$, $39^2$, . . . , $39^n$ of the pulse train oscillators 38, $38^1$, $38^2$, . . . , $38^n$ of all the scale interpolation units VII, VIII, IX, etc., where the said signal is stored. At the time moment $t_o$ the signal indicating the end of the reference time interval $T_o$ will close the master key 24, excite the pulse train oscillator 38 and open the complementary key 32 of the master scale interpolation unit VII. The above-mentioned complementary key 32 transfers pulses of the frequency to be digitized from the output of the shaper 35 to the complementary counter 34. The above-mentioned pulse train oscillator 38, in accordance with the previously stored value of the period $T_x$ of the frequency to be digitized, will produce a series of pulses at a repetition rate $T_1$ that can be, for instance $T_1$=0.9 $T_x$. The pulses from the output of the generator 38 will be applied to the input 27 of the pulse coincidence circuit 28. The input 29 of the circuit 28 will be fed, from the pulse duration shaper 41, with pulses of the frequency to be digitized whose duration is $\tau_1$ in accordance with the previously stored value $T_x$ of the period of the frequency to be digitized which can be, for instance, $\tau_1$= $0.1T_x$. Diagrams 69, 70 (FIG. 8) show, on an enlarged scale, signals appearing at the inputs 29, 27 of the pulse coincidence circuit 28 at a time interval that is close to the moment to. It is evident that if the above relationships between the values of $T_x$; $T_1$ and $\tau_1$ are observed, one out of the nine pulses at the input 27 of the circuit 28 will coincide in time with a certain pulse at its input 29. At the moment of pulse coincidence the circuit 28 will produce a signal which will close the complementary key 32. Thus, the complementary counter 34 will register a number of pulses, such as $n_1$, equal to the succeeding for instance, decimal, digit of the digital equivalent of the frequency to be digitized. Simultaneously, a signal from the output of the pulse coincidence circuit 28 will excite the pulse train oscillator $38^1$ and open the complementary key $32^1$ of the complementary scale interpolation unit VIII (time moment $t_1$ in the diagrams of FIG. 8). Corresponding to this moment of time and shown respectively in diagrams 71, 72, 73 (FIG. 8) are signals 29 and 27 of the pulse coincidence circuit 28, as well as pulses at the input of the pulse train oscillator $38^1$. The dashed line in diagram 73 marks the moment when the oscillator $38^1$ is triggered. In accordance with the previously stored value of the period $T_x$ of the frequency to be digitized, the above-mentioned oscillator $38^1$ will produce a series of pulses with a repetition rate $T_2$, which can be, for instance, $T_2$=0.99 $T_x$. Pulses from the output of the oscillator $38^1$ are applied to the input $27^1$ of the pulse coincidence circuit $28^1$. The input $29^1$ of the circuit $28^1$ will be fed, from the pulse duration shaper $41^1$, with pulses of the frequency to be digitized whose duration is $\tau_2$ in accordance with the value of the previously stored period $T_x$ of the frequency to be digitized which can be, for instance, $\tau_2$ =0.01 $T_x$. Pulses from the output of the shaper 35 of pulses of the frequency to be digitized are applied, via the open complementary key $32^1$, to the complementary counter $34^1$. It is evident that if the selected relationships between the values of $T_x$; $T_2$; $\tau_2$ are observed, one out of the nine pulses at the input $27^1$ of the pulse coincidence circuit $28^1$ will coincide in time with some pulse at its input $29^1$. At this moment of the pulse coincidence the circuit $28^1$ will produce a signal which will close the complementary key $32^1$. Thus, the complementary counter $34^1$ will register a number of pulses, for instance $n_2$, equal to the value of the successive digit of the digital equivalent of the frequency to be digitized. Simultaneously, a signal from the output of the pulse coincidence circuit $28^1$ will excite the pulse train oscillator $38^2$ and open the complementary key $32^2$ of the complementary scale interpolation unit IX (moment of time $t_2$ in FIG. 8). Corresponding to this moment of time and shown respectively in diagrams 74, 75, 76 (FIG. 8) are signals at the inputs $29^1$ and $27^1$ of the pulse coincidence circuit $28^1$, as well as pulses at the output of the pulse train oscillator $38^2$. The dashed line in diagram 76 marks the moment when the above-mentioned oscillator $38^2$ is excited.

The complementary scale interpolation unit IX operates in the way similar to the of the units VII and VIII and which has already been described. The period $T_3$ of the repetition rate of the pulses produced by the oscillator $38^2$ is selected, for instance, to be $T_3$=0.999$T_x$ while the input $29^2$ of the pulse coincidence circuit $28^2$ is fed with pulses whose duration $\tau_3$ is selected to be for instance, $\tau_3$=0.001$T_x$. Thus, the complementary counter $34^2$ will record, for instance, a number $n_3$ of pulses produced by the shaper 35 of pulses of the frequency to be digitized and transferred through the complementary key $32^2$. For the example given above the result of the analog-to-digital conversion of the frequency $f_x$ will be expressed as $f_x = (1/T)\ (n_o + 0.1\ n_1 + 0.01\ n_2 + 0.001\ n_3)$ To reduce the requirements of stability of the pulse duration $\tau$ and to exclude the possibility of conversion errors, the complementary counters 34, 34$^1$, 34$^2$, . . . , 34$^n$ of all the scale interpolation units VII, VIII, IX, etc. are connected to one another in series in the way similar to that of the device for analog-to-digital conversion of time intervals described above (FIG. 3). The technique described above can be used to design a device for analog-to-digital frequency conversion operating with any number base.

Figure 5:
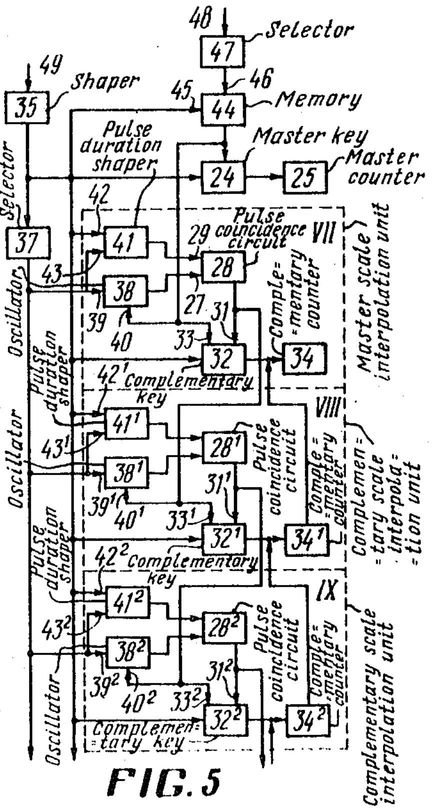
FIG. 5 is a block diagram of an analog-to-digital converter of time interval ratios.

The device for analog-to-digital conversion of ratios between time intervals, the block-diagram of which is presented in FIG. 5, operates in the way similar to that of the device for analog-to-digital frequency conversion (FIG. 4) and can be explained with the help of the diagrams in FIG. 8. If this device is used for frequency analog-to-digital conversion the selector 47 of the time interval of the dividend will separate the reference time interval that will be stored in the memory 44 of the time interval of the dividend. The memory 44 is excited by the first pulse of the frequency to be digitized which arrives from the output of the shaper 35 of pulses of the frequency to be digitized. At this time the above-mentioned memory 44 opens the master key 24 for a time interval equal to the reference time interval that has been stored earlier. When this device is used for analog-to-digital conversion of a phase shift angle between two oscillations under study whose repetition period is $T_x$ the selector 47 of the time interval of the dividend separates the time interval which determines the phase shift between the said two oscillations. The memory 44 of the time interval of the dividend stores the above-mentioned time interval that has been separated by the selector 47. The memory 44 is excited at the moment when the first pulse from the output of the shaper 35 of pulses of the frequency to be digitized arrives to it and restores the above-mentioned time interval that has been stored earlier. The period $T_1$ of the repetition rate of pulses produced by the pulse train oscillator 38 can be selected, for instance, as $T_1 = (26/36)T_x$, while the duration $\tau_1$ of the pulses produced at the output of the pulse duration shaper 4l can be selected, for instance, as $T_1 = (10/36)T_x$. In this case the readings of the counter 34 will correspond to a whole number of hundreds of degrees which make up the above-mentioned value of the phase shift. Here, one can select the period $T_2$ of the repetition rate of pulses produced by the pulse train oscillator 38$^1$ as, for instance, $T_2 = (35/36)\ T_x$, while the duration $\tau_2$ of pulses arriving from the output of the pulse duration 41 can be selected as, for instance, $T_2 = (1/36)\ T_x$. In this case the readings of the complementary counters 34, 34$^1$ will in total correspond to the whole number of tens of degrees which make up the phase shift angle, etc. When said device is used for analog-to-digital conversion of a ratio between two frequencies, the selector 47 of the time interval of the dividend separates one period of the oscillations of the signal with a frequency $f_1$ of the divisor. In this case the memory 44 will be excited as soon as the first pulse of the dividend frequency $f_2$ appears at the output of the shaper 35. Then, the value of the frequency ratio to be digitized will be expressed, for instance, as $(f_1/f_2) = n_o + 0.1\ n_1 + 0.01 n_2 + 0.001\ n_3$ where $n_o; n_1; n_2; n_3$ are the number of pulses registered by the counters 25, 34, 34$^1$, 34$^2$ respectively, in the course of the conversion procedure.

And finally, in the course of analog-to-digital conversion, in percent, of a deviation of the frequency of oscillations under study relative to a rated value the selector 47 separates a period of the oscillation of the rated frequency $f_n$. Here, in order to obtain a result that will be proportional to the deviation, in percent, of the frequency of the oscillations under study from the rated value, the number stored in the master counter 25 should be decreased by unity. In this case the readings of the master counter 25 will correspond to the whole number of hundreds of percent, those of the complementary counters 34, 34$^1$, 34$^2$, to tens, unities and tenths of percent, respectively, and so on. The content of the master counter 25 can be reduced by unity by means of recording, in all of its digits, a number equal to the top digit in the number base used in the system. In case of a decimal number base this number will be nine.

The following examples will facilitate the description of the method for registering the number proportional to the deviation, in percent, of the frequency $f_x$ of oscillations under study from the rated value $f_n$. Suppose, for instance, that the master counter 25 of the device for analog-to-digital conversion of time interval ratios contains a single decimal digit. Suppose also that the complementary counters 34, 34$^1$, 34$^2$ of the given device contain each a single decimal digit, too. In the initial state the counters contain the code 9000.

a. Let, for instance $f_n$=100 conditional units and $f_x$=120 conditional units.

Actually, the given device produces a code of the ratio $f_x/f_n$ = 1.2. In this case the counters 34$^2$ and 34$^1$ will register "0", the counter 34 will register "2" and the master counter 25 will register 1. Since earlier the counter 25 has registered a "9", the addition of an additional unity will cause an overflow of the counter. The overflow pulse in the counter 25 indicates that the value of the deviation, in percent, to be digitized is positive and that the readings of the counters should be interpreted in a direct code.

Hence, the registering device will read +0.200, which is proportional to the frequency deviation value in percent.

b. Let, for instance, $f_n$=100 conditional units and $f_x$=80 conditional units. Actually, the given device produces a code of the ratio $f_x/f_n$=0.80. In this case the counters 34$^2$ and 34$^1$ will register "0"; the counter 34 will register "8" and the master counter 25 will register "0." The absence of an overflow pulse at the output of the master counter 25 indicates that the value of the deviation in percent is negative and that the readings of the counters should be interpreted in a code which is complementary to, say, 10.000. Hence, the registering device will read − 0.200 which is proportional to the deviation, in percent, of the frequency of the oscillations under study with respect to the rated value.

The rest of the operation of the device for analog-to-digital conversion of ratios between time intervals is similar to that of the device for analog-to-digital frequency conversion.

Figure 6:
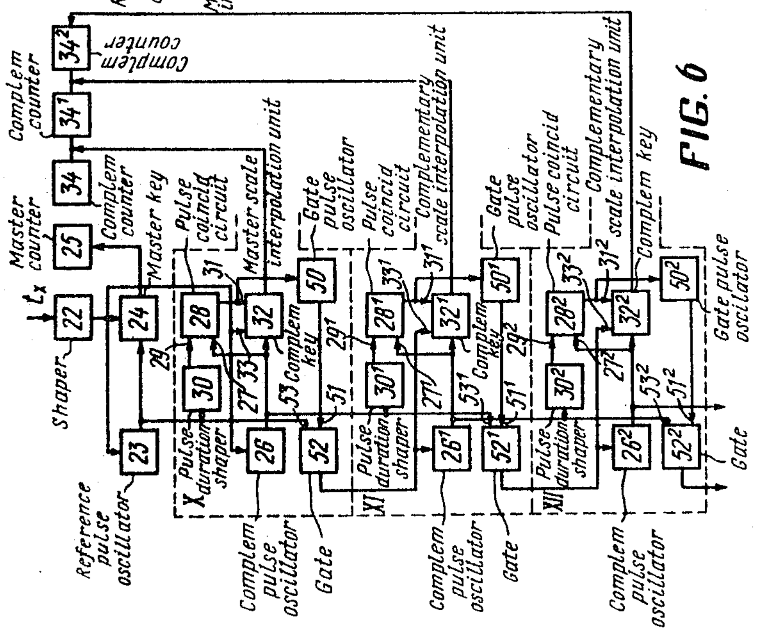
FIG. 6 is a block diagram of another form of the analog-to-digital converter of time intervals.

It will be convenient to consider the operation of another version of the device for time interval analog-to-digital conversion, the block diagram of which is presented in FIG. 6, in conjunction with time relationships pertaining to it and shown schematically in FIG. 9. Diagram 77 in FIG. 9 pertains to the output of the reference pulse oscillator 23. Diagrams 78, 79 and 80 show output signals of complementary pulse oscillators, 26, 26$^1$ and 26$^2$, respectively.

During the first stage of time interval analog-to-digital conversion from the moment when the shaper 22 of the time interval to be digitized produces at its output a pulse indicating the beginning of the time interval to be digitized, to the moment $t_1$ when a signal appears at the output of the pulse coincidence circuit 28, the operation of the device shown in FIG. 6 does not differ from that of the above-described first version of the device (FIG. 3). The only exception consists in that the complementary counter 34 counts the number, for instance, $n_1$, of pulses produced by the complementary pulse oscillator 26. Here, the pulse repetition period $T_o$ of the oscillator 23, the pulse repetition period $T_1$ of the complementary oscillator 26 and the duration $\tau_1$ of pulses arriving from the output of the pulse duration shaper 30 to the input 29 of the pulse coincidence circuit 28 can be selected on the basis of the same relation as in the above described first version of the device. A signal appearing at the time moment $t_1$ at the output of the pulse coincidence circuit 28 will excite the oscillator 50 which produces a strobing pulse fed to the input 51 of the gate 52. The duration of the strobing pulse exceeds slightly the pulse repetition period $T_o$ of the oscillator 23. When the input 53 of the gate 52 is fed with a pulse from the output of the oscillator 23 which arrives right after the moment of time $t_1$, the gate 52 will open to produce, at the moment of time $t_1{}^1$, an output pulse which excites the complementary pulse oscillator 26$^1$ of the complementary scale interpolation unit XI and opens the complementary key $32^1$ of the said unit XI.

Diagrams 81, 82 (FIG. 9) show, on an enlarged scale, output pulses of the reference pulse oscillator 23 and pulses at the output of the complementary pulse oscillator 26, respectively, at a moment of time which corresponds to the end of the time interval to be digitized. The dashed line in FIG. 82 indicates the moment when the complementary pulse oscillator 26 is triggered. Diagrams 83 and 84 show signals at the inputs 29 and 27 of the coincidence circuit 28, respectively. A dashed line and an arrow in diagram 85 indicate the moment of time $t_1$ when the complementary pulse oscillator 26' is triggered. The arrow shows that the moment of oscillator $26^1$ triggering corresponds to the leading edge of the pulse produced by the reference pulse oscillator 23 right after the moment of time $t_1$. The pulse repetition period of the complementary oscillator $26^1$ is selected, for instance, as $T_2=0.89\ T_o$. The complementary scale interpolation unit XI operates in a way similar to that of the master scale interpolation unit X described above. Pulses from the output of the complementary oscillator $26^1$ are fed, via the complementary key $32^1$, to the input of the complementary counter $34^1$ and to the input $27^1$ of the pulse coincidence circuit $28^1$. The input $29^1$ of this circuit $28^1$ is fed, via the pulse duration shaper $30^1$, with pulses from the output of the complementary pulse oscillator $26^2$, having a repetition period of $T_1$.

The duration of these pulses is selected, for instance, as $T_2=0.01T_o$. It is evident, that with the given relationship between the values of $T_1$; $T_2$; $\tau_2$ one out of the nine pulses at the input $27^1$ of the pulse coincidence circuit $28^1$ will coincide in time with a certain pulse at its input $29^1$. At this moment of pulse coincidence the circuit $28^1$ will produce a signal that closes the complementary key $32^1$ (moment of time $t_2$ in FIG. 9). Hence, the complementary counter $34^1$ will register a number of pulses, such as $n_2$, equal to the value of the next digit of the digital equivalent of the time interval to be digitized. Simultaneously, a signal from the output of the pulse coincidense circuit $28^1$ excites the strobe pulse oscillator $50^1$ which produces a strobing pulse appearing at the input $5I^1$ of the gate $52^2$ and having a duration which exceeds slightly the repetition period $T_1$ of pulses produced by the complementary oscillator 26. When the input $53^1$ of the gate $52^1$ is fed with a pulse that arrives right after the moment of time $t_2$ from the output of the complementary oscillator 26, the gate $52^1$ will open to produce a signal which at the moment of time $T_2^1$ will excite the complementary pulse oscillator $26^2$ of the complementary scale interpolation unit XII and open the complementary key $32^2$of this unit XII. Diagrams 86, 87 in FIG. 9 show, on an enlarged scale, signals appearing respectively at the inputs $29^1$ and $27^1$ of the pulse coincidence circuit $28^1$. The dashed line and the arrow in diagram 88 indicate the moment $T_2^1$ when the complementary pulse oscillator $26^2$ is triggered. The arrow shows that the moment when the oscillator $26^2$ is triggered corresponds to the leading edge of the pulse produced by the complementary pulse oscillator $26^1$ right after the moment of time $t_2$. The complementary scale interpolation unit XII operates in the way similar to that of the scale interpolation units X, XI described above. The repetition period $T_3$ of pulses produced by the complementary oscillator $26^2$ is selected, for instance, as $T_3=0.889\ T_o$, while the input $29^2$ of the pulse coincidence circuit $28^2$ is fed with pulses from the complementary oscillator $26^1$ whose duration is $\tau_3$ which can be, for instance, $T_3=0.001T_o$. In this case the complementary counter $34^3$ will register for instance, a number $n_3$ of pulses produced by the pulse complementary oscillator $26^2$ and fed through the complementary key $32^2$. The result of this example of analog-to-digital conversion of the time interval $T_x$ will be expressed as $$t_x=T_o\ [\ n_o+0.1n_1+0.01(9n_2)+0.001n_3\ ]$$

The above procedure can be used to evaluate any number of orders in the digital equivalent of a time interval to be digitized. Here, the readings of the complementary counters having, for instance, even serial numbers, will be registered (encoded) in the complementary code. To reduce the requirements of the stability of the pulse duration $\tau$ and to eliminate conversion errors, the complementary counters 34, $34^1$, $34^2$, . . . , $34^n$ of all the scale interpolation units X; XI; XII; etc., are connected to one another in-series. The main difference of the above-described version of the device for time interval analog-to-digital conversion from the first version thereof (FIG. 3) that has been described earlier consists in that the functions of the reference pulse oscillator 23 in it can be performed by an oscillator producing a limited number of pulses and similar to the complementary oscillators 26; $26^1$; $26^2$, . . . , $26^n$.

The principal advantage of the invention consists in that the evaluation of all the orders in the digital equivalent of the value to be digitized can be carried out with the use of value standards (measures) whose magnitudes are close, for instance, to that of the sampling constant of the top digit in the given digital equivalent. The invention can be used for analog-to-digital conversion of any physical values and their ratios.

In the case of analog-to-digital conversion of the frequency of oscillations under study, the invention enables reducing the time required to evaluate every decimal order in the digital equivalent of the frequency value being digitized to the level, for instance, of 10 periods of this frequency.

In the case of analog-to-digital conversion of time intervals the invention enables, for instance, to reducing the clock pulse frequency at the expense of a quite insignificant increase of the time required for the conversion. It makes it possible, for instance, to digitize short time intervals with a high degree of accuracy with the help of average speed counters.

In the case of analog-to-digital conversion of frequency ratios the invention allows to digitize, with a high degree of accuracy, a ratio of frequencies close to each other in value, as well as to accurately digitize the deviation, in percent, of the frequency of the oscillation under study with respect to the rated value thereof. Here again the time required to evaluate every decimal order of the digital equivalent of the deviation, in percent, which is being digitized, will not exceed, for instance, 10 periods of the frequency of the oscillations under study.

In the case of analog-to-digital conversion of a phase shift angle between two oscillations under study, the invention permits obtaining the digital equivalent of the phase angle both in terms of relative fractions of the period of the oscillations under study and directly in terms of an absolute value of a phase shift angle, such as degrees, radians, etc. Here, the value of the digital equivalent does not depend on the frequency of the oscillations under study, while the analog-to-digital conversion does not require any additional computation to find the ratio of the obtained result of the conversion to the value of the period of the oscillations.

Another advantage of the invention consists also in that all the devices required for its embodiment and intended for analog-to-digital conversion of frequency time signals are similar in design and can be easily standardized.

What we claim is:

1. A method of analog-to-digital conversion of physical values, comprising forming a reference scale of standards based on a reference value, using said reference scale for comparing the value to be digitized against it, separating a remainder left over as a result of said first comparison, calculating the value standard of said reference scale expressed as a sum of two zones one of which is equal in magnitude to a sampling constant of the result of said remainder; producing a complementary scale of standards equal in magnitude to a remaining zone of the value standard of said reference scale; shifting said complementary standard scale by a value equal to said remainder left over as a result of said first comparison; comparing said complementary scale against said reference scale; determining the numerical value of said remainder left over as a result of said first comparison in accordance with the number of the mark of said complementary scale coinciding with one of said first zones of said reference scale; separating the remainder left over as the result of said second comparison as a difference between said mark of the complementary scale coinciding with one of said first zones of said reference scale and the beginning of said coinciding zone; determining the numerical value of said remainder obtained as the result of the second comparison by repeating the operations enumerated above until the required accuracy of conversion is obtained.

2. A method as claimed in claim 1, wherein the function of a reference scale in the course of every successive comparison is performed by the scale that has served as the complementary one in the course of the preceding comparison.

3. A method of analog-to-digital conversion of ratios between physical values, which consists in shaping a reference scale of value standards based on the magnitude of the divisor, comparing the magnitude of the dividend against said reference scale, separating the remainder left over as a result of said first comparison, calculating said remainder by means of the value standard of said reference scale expressed as a sum of two zones one of which is equal in magnitude to the sampling constant of the result of said step of calculating the remainder; producing a complementary scale of standards equal in magnitude to the remaining zone of the value standard of said reference scale; shifting said complementary standard scale by a value equal to said remainder left over as a result of said first comparison; comparing said complementary scale against said reference scale; determining the numerical value of said remainder left over as a result of said first comparison in accordance with the number of the mark of said complementary scale coinciding with one of said first zones of said reference scale; separating the remainder left over as the result of said second comparison as a difference between said mark of said complementary scale coinciding with one of said first reference scales and the beginning of said coinciding zone; determining the numerical value of said remainder left over as a result of said second comparison by repeating the operations enumerated above until the required accuracy of conversion is obtained.

4. A device for analog-to-digital conversion of time intervals, comprising: a shaper of time intervals to be digitized; a master key having a control input which is connected to the output of said shaper; a reference pulse counter having an input which is connected to the output of said master key; a reference pulse oscillator having an input which is connected to the output of said shaper and an output connected to the signal input of said master key; a master scale interpolation unit having a complementary pulse oscillator with an input connected to said shaper; a pulse duration shaper having an input connected to the output of said reference pulse oscillator; a coincidence circuit having one input connected to the output of said pulse duration shaper and a second input connected to the output of said complementary pulse oscillator; a first control input connected to the output of said coincidence circuit, and a second control input connected to the output of said shaper of time intervals to be digitized; a complementary pulse counter having an input connected to the output of said complementary key; a plurality of complementary scale interpolation units the number of which is selected according to the required accuracy and speed of conversion and which are designed in the way similar to that of said master scale interpolation unit, the input of the complementary oscillator in every successive complementary scale interpolation unit being connected to the output of said coincidence circuit in every preceding unit; the inputs of said pulse shapers in all units being connected to the output of said reference pulse oscillator and said complementary counter in all said units being connected to one another in series.

5. A device for analog-to-digital frequency conversion, comprising; a shaper of pulses of the frequency to be digitized; a master key having a control input connected to the output of said shaper; a master pulse counter having an input connected to the output of said master key; a reference time interval oscillator having an input connected to the output of said shaper and an output connected to the control input of said master key; a selector of the period of the frequency to be digitized having an input connected to the output of said shaper; at least one master scale interpolation unit having an oscillator of trains of pulses forming a complementary scale, the said oscillator having a first input connected to the output of the selector of the period of the frequency to be digitized; a pulse duration shaper having a first input connected to the output of said shaper of pulses of the frequency to be digitized and a second input connected to the output of said selector; a coincidence circuit having a first input connected to the output of said pulse train oscillator and a second input connected to the output of said pulse duration shaper; a complementary key having a signal input coupled with the output of said shaper of pulses of the frequency to be digitized, a first control input connected with the output of said coincidence circuit, and a second control input connected with the second control input of said pulse train oscillator and with the output of said reference time interval oscillator; a complementary pulse counter having an input connected to the output of said complementary key; a plurality of complementary scale interpolation units, the number of which is selected in accordance with the required accuracy and speed of conversion and which are designed in the way similar to that of said master scale interpolation unit, while the first input of said pulse duration shaper and the signal input of said complementary key in each interpolation unit are connected to the output of said shaper of pulses of the frequency to be digitized; the first input of said pulse train oscillator in each interpolation unit is connected to said selector of pulses of the frequency to be digitized; the second input of said pulse train oscillator in each successive interpolation unit is connected to the second control input of said complementary key of the same unit and to the output of said coincidence circuit of the preceding unit, and said complementary counters of all units are connected to one another in series.

6. A device as claimed in claim 5, for analog-to-digital conversion of ratios between time intervals, comprising: a selector of the dividend time interval; a memory having a first input connected to the output of said dividend time interval selector, a second input connected to the output of said shaper of pulses of the frequency to be digitized, and an output connected to the control input of said master key, while the input of said shaper of pulses of the frequency to be digitized is fed with pulses whose repetition period is equal to the time interval of the divisor.

7. A device for analog-to-digital conversion of time intervals, comprising: a shaper of the time interval to be converted; a master key having a control input connected to the output of said shaper; a reference pulse counter having an input connected to the output of said master key; a reference pulse oscillator having an input connected to the output of said shaper and an output connected to the signal input of said master key; an interpolation unit of said master scale provided with a complementary pulse oscillator having an input connected to said shaper; a pulse duration shaper having an input connected to the output of said reference pulse oscillator; a coincidence circuit having a first input connected to the output of said pulse duration shaper and a second input connected to the output of said complementary pulse oscillator; a complementary key having a signal input connected to the output of said complementary pulse oscillator, a first control input connected to the output of said coincidence circuit, and a second control input connected to the output of said shaper of the time interval to be digitized; a complementary counter having an input connected to the output of said complementary key; a strobe pulse oscillator having an input connected to the output of said coincidence circuit, a gate having a first input connected to the output of said reference pulse oscillator and a second input connected to the output of said strobe pulse oscillator; a plurality of complementary scale interpolation units the number of which is selected in accordance with the required accuracy and speed of conversion and which are substantially identical with said master interpolation unit while the input of said complementary oscillator of every successive interpolation unit is connected to the second control input of said complementary key of the same unit and to the output of said gate of the preceding unit; the output of said complementary pulse oscillator of every preceding unit is connected to the input of said pulse duration shaper and to the first input of said gate of the successive unit, and said complementary pulse counters of all units are connected to one another in series.

* * * * *